United States Patent [19]

Shrinkle

[11] Patent Number: 5,734,522

[45] Date of Patent: Mar. 31, 1998

[54] DISC DRIVE SYSTEM WITH SLIDER FOR READING AND WRITING ADJACENT PORTIONS OF A ZONE TEXTURED DISC

[75] Inventor: Louis J. Shrinkle, Leucadia, Calif.

[73] Assignee: Seagate Technology, Inc., Scotts Valley, Calif.

[21] Appl. No.: 677,874

[22] Filed: Jul. 10, 1996

[51] Int. Cl.$^6$ .................................................. G11B 5/60
[52] U.S. Cl. .................................... 360/103; 360/104
[58] Field of Search ............................ 360/103–104, 360/105–106

[56] References Cited

U.S. PATENT DOCUMENTS

| | | | |
|---|---|---|---|
| 5,086,360 | 2/1992 | Smith | 360/104 |
| 5,371,939 | 12/1994 | Ressmeyer | 360/104 |
| 5,396,386 | 3/1995 | Bolasna | 360/103 |
| 5,537,269 | 7/1996 | Zarouri | 360/104 |

*Primary Examiner*—A. J. Heinz
*Attorney, Agent, or Firm*—Westman, Champlin & Kelly, P.A.

[57] ABSTRACT

This invention provides for increasing useful data area on a zone-textured disc. The disc drive device has at least one disc having a CSS zone and a data zone with a plurality of concentric tracks on the disc surface. The contact start/stop zone of the disc surface is where the slider takes off from and lands on the disc surface. Each track includes at least one data segment capable of storing data. A transducer writes data to and reads data from the concentric tracks on the surface of the disc. The transducer is connected to a slider which has an air bearing surface (ABS) with an inner side and an outer side. In the present invention, the fly height of the inner side of the ABS is greater than a fly height of the outer side of the ABS in the area of the data zone nearest to the CSS zone. Offsetting the fly height of the inner side of the ABS to be greater than the fly height of the outer side of the ABS allows the slider to move slightly from the CSS zone to the data zone so that a portion of the ABS containing the transducer is over the data zone nearest to the CSS zone.

17 Claims, 5 Drawing Sheets

DISC DRIVE SYSTEM WITH SLIDER FOR READING AND WRITING ADJACENT PORTIONS OF A ZONE TEXTURED DISC

FIELD OF THE INVENTION

The present invention is directed to disc drives. More particularly, the present invention provides an apparatus and method for increasing useful data area on a zone-textured disc in a disc drive device.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks that extend circumferentially around the disc. Each data track is divided into a series of data sectors and store data in the form of magnetic transitions on the disc surface.

In a conventional disc drive design, each data sector of a data track is divided into a number of fields, including an address header field that contains magnetic transitions representing unique identification information for the specific data stored in the data sector. In this manner, the disc drive system can locate and verify the exact data sector for any particular block of data that a host computer may require, e.g., in a read operation. Among the information stored in an address header field is head identification information to uniquely identify the particular head of a head stack assembly that is transducing the magnetic transitions, track number, data sector identification and track defect information.

A zone-textured disc is divided into a contact start/stop (CSS) zone and a data zone. The CSS zone is a textured area of the disc surface where the slider takes off and lands when the disc spins up and spins down, respectively. The use of a zone-textured disc allows for very low glide heights and spacing in the data area while giving very good contact start/stop and stiction performance in the landing zone.

The optimal zone-textured disc configuration would be where the slider take off and landing would occur so that all air-bearing surface (ABSs) of the slider fit into the CSS zone. When the head is accessing data, the entire slider would then optimally be over only the data zone. This would prevent stiction and high friction during takeoff and landing, and would prevent slider contacts with the disc surface during data accessing. The problem in this system, however, is that a portion of the data zone must be given up to account for the width of the slider.

SUMMARY OF THE INVENTION

This invention provides for increasing useful data area on a zone-textured disc. The disc drive device has at least one disc having a CSS zone and a data zone with a plurality of concentric tracks on the disc surface. The contact start/stop zone of the disc surface is where the slider takes off from and lands on the disc surface. Each track includes at least one data segment capable of storing data. A transducer writes data to and reads data from the concentric tracks on the surface of the disc. The transducer is connected to a slider which has an ABS with an inner side and an outer side.

In the present invention, at the data zone nearest the CSS zone, the fly height of the inner side of the ABS is greater than a fly height of the outer side of the ABS. Offsetting the fly height of the inner side of the ABS to be greater than the fly height of the outer side of the ABS allows the slider to move only slightly from the CSS zone to the data zone so that a portion of the ABS containing the transducer is over the data zone.

The fly height of the inner side of the ABS can be made greater than the fly height of the outer side of ABS by many methods including load point adjust, air bearing asymmetry, and negative pressure effects. A typical value for the fly height of the inner side of the ABS is 1.0 µin to 2.0 µin and for the fly height of the outer side of the ABS is 0.5 µin to 1.5 µin. The optimal placement of the transducer is arranged nearest to the edge of the outer side of ABS.

DETAILED DESCRIPTION OF THE PREFERRED EMBODIMENTS

Figure 1:
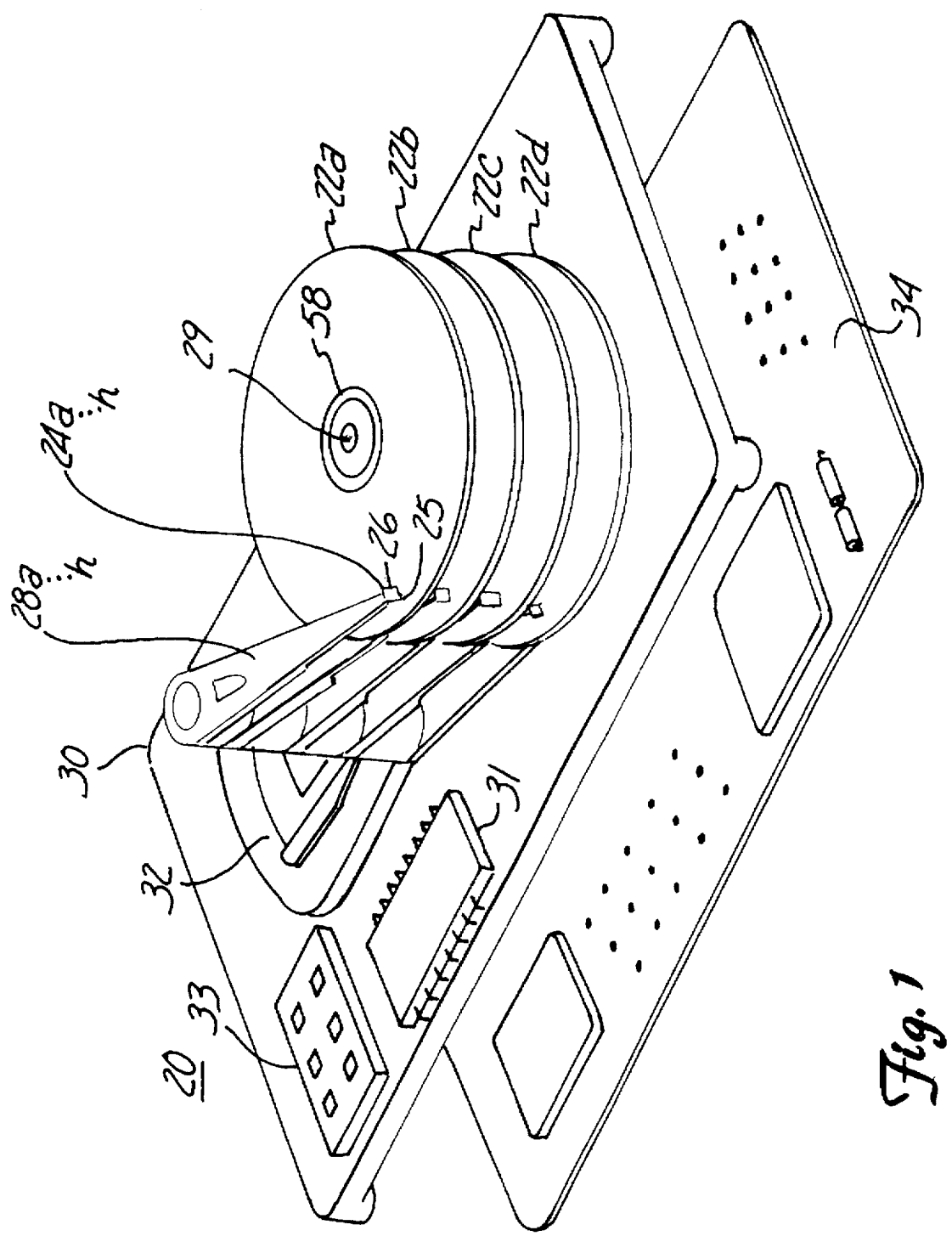
FIG. 1 is a perspective view of an exemplary disc drive.

Referring now the drawings, and initially to FIG. 1, there is illustrated an example of a disc drive designated generally by the reference numeral 20. The disc rive 20 includes a stack of storage discs 22a–d and a stack of read/write heads 24a–h. Each of the storage discs 22a–d is provided with a plurality of data tracks to store user data. As illustrated in FIG. 1, one head is provided for each surface of each of the discs 22a–d such that data can be read from or written to the data tracks of all of the storage discs. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. Alternatively, each of the read/write heads 24a–h can be a magnetoresistive (MR) head as known in the art. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage discs 22a–d. The manner for coupling the PCB 34 to the various components of the disc drive is well known in the art.

Figure 2:
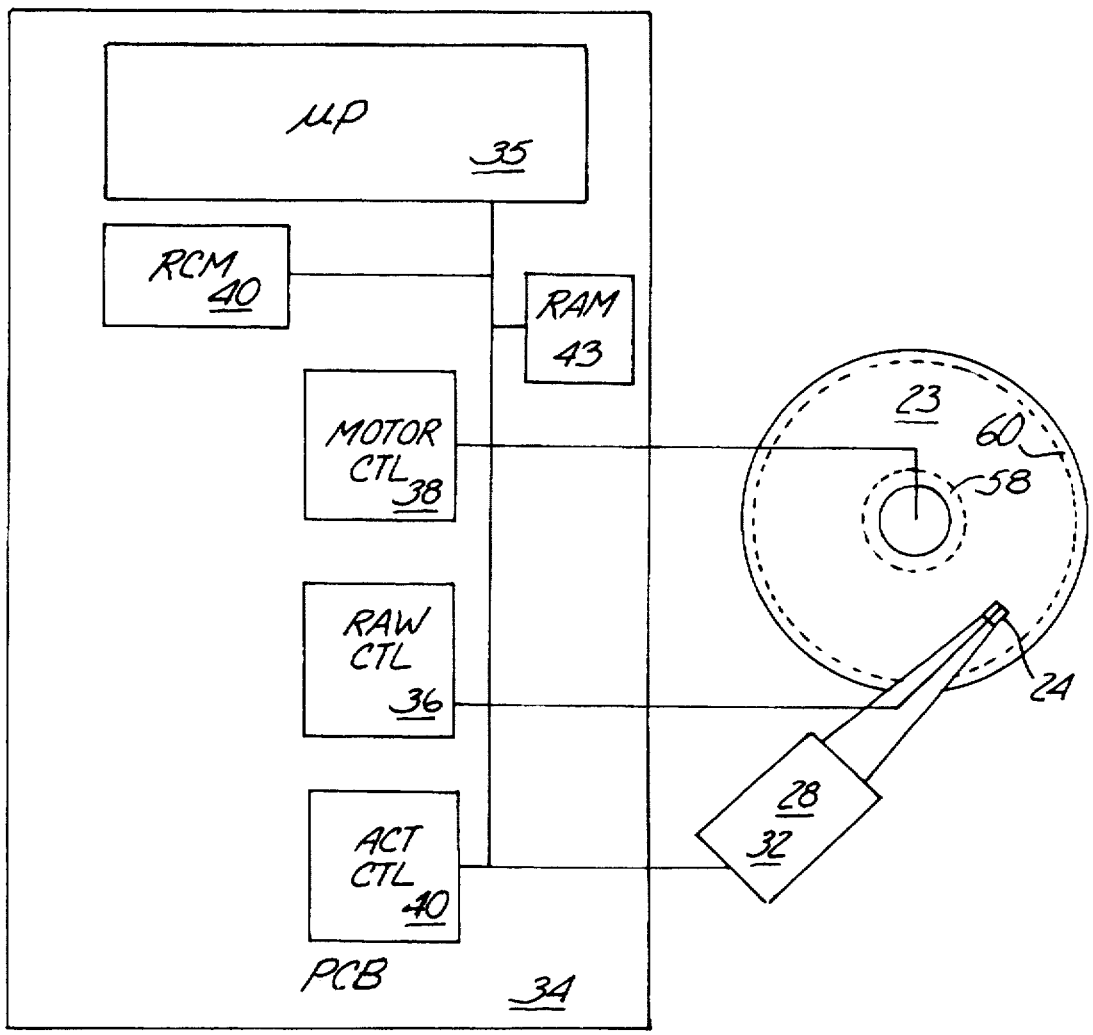
FIG. 2 is a top plan view of the printed circuit board of the disc drive of FIG. 1.

Referring now to FIG. 2, there is illustrated in schematic form the PCB 34 and the electrical couplings between the control electronics on the PCB 34 and the components of the disc drive system described above. A microprocessor 35 is coupled to each of a read/write control 36, spindle motor control 38, actuator control 40, read-only memory (ROM) 42 and random access memory (RAM) 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and speed of the read/write heads 24a–h.

When data to be written or read from one of the storage discs 22a–d are stored in a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h, over the specific data track to be written or read, to the read/write control 36, as is generally know in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing. The RAM 43 can be used to buffer data read from or to be written to the data sectors of the storage discs 22a–d via the read/write control 36. The buffered data can be transferred to or from a host computer utilizing the disc drive for data storage.

Figure 3:
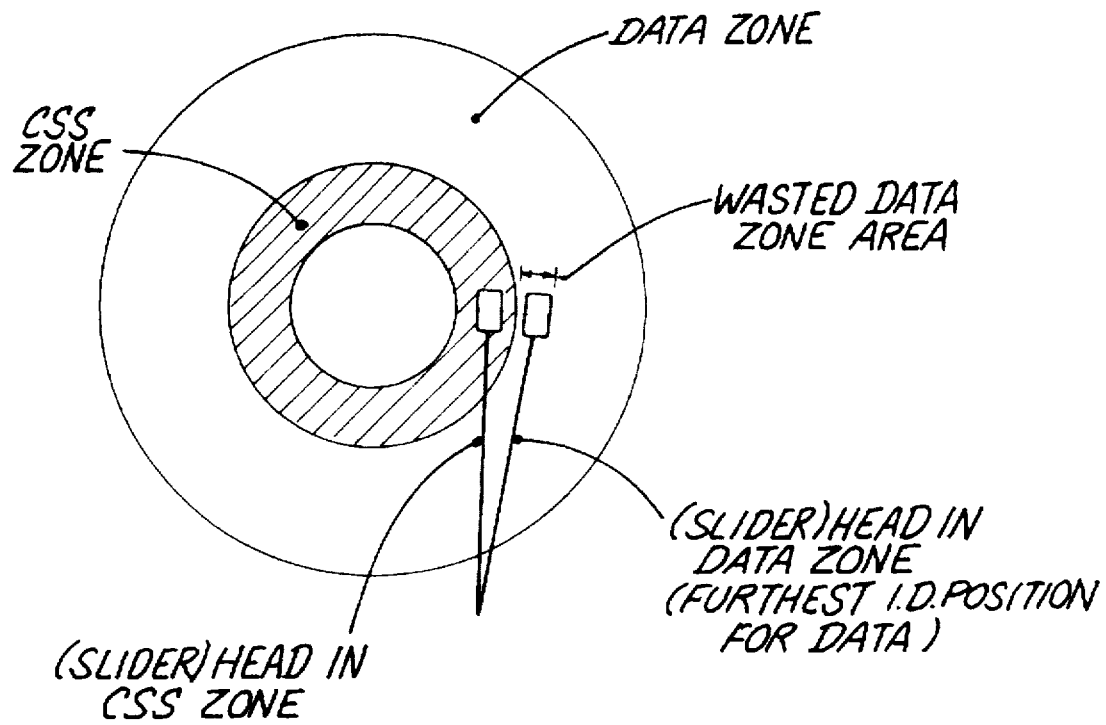
FIG. 3 is a top plan view of a slider and a zone-textured disc which has a wasted data zone area characteristic of the prior art.

In the prior art, to avoid the inner ABS contacting with the disc surface in the CSS zone while accessing data, a portion of the data zone is given up to account for the width of the slider. FIG. 3 illustrates such a configuration. Note that data is not being written to or read from the disc surface over the portion of the data zone equal to the width of the slider from CSS zone.

Figure 4:
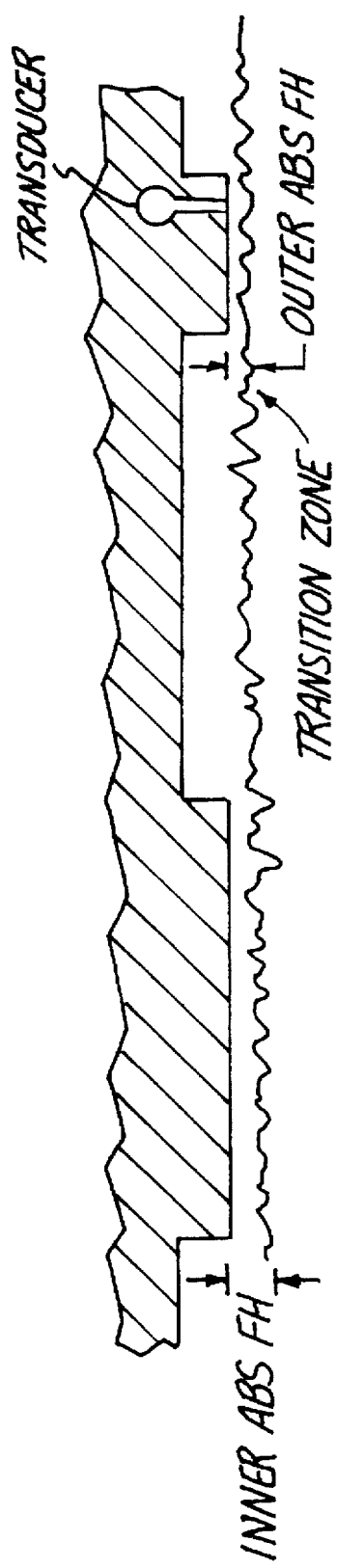
FIG. 4 is a cross-sectional view of the slider and the zone-textured disc surface.

For the present invention, FIG. 4 shows a cross-section of the slider over the zone-textured disc surface. This figure illustrates one side of the slider in the CSS zone and the other side of the slider at the furthest inner diameter (ID) position of the data zone. The present invention allows the slider to move slightly from the CSS zone to the ID of the data zone such that the ABS of the slider that contains the transducer is over the data zone inside of the ID. It is assumed that the optimum place for the transducer is on the outer diameter (OD) of the slider ABS. The inner side of the ABS could therefore be over the CSS zone.

Figure 5:
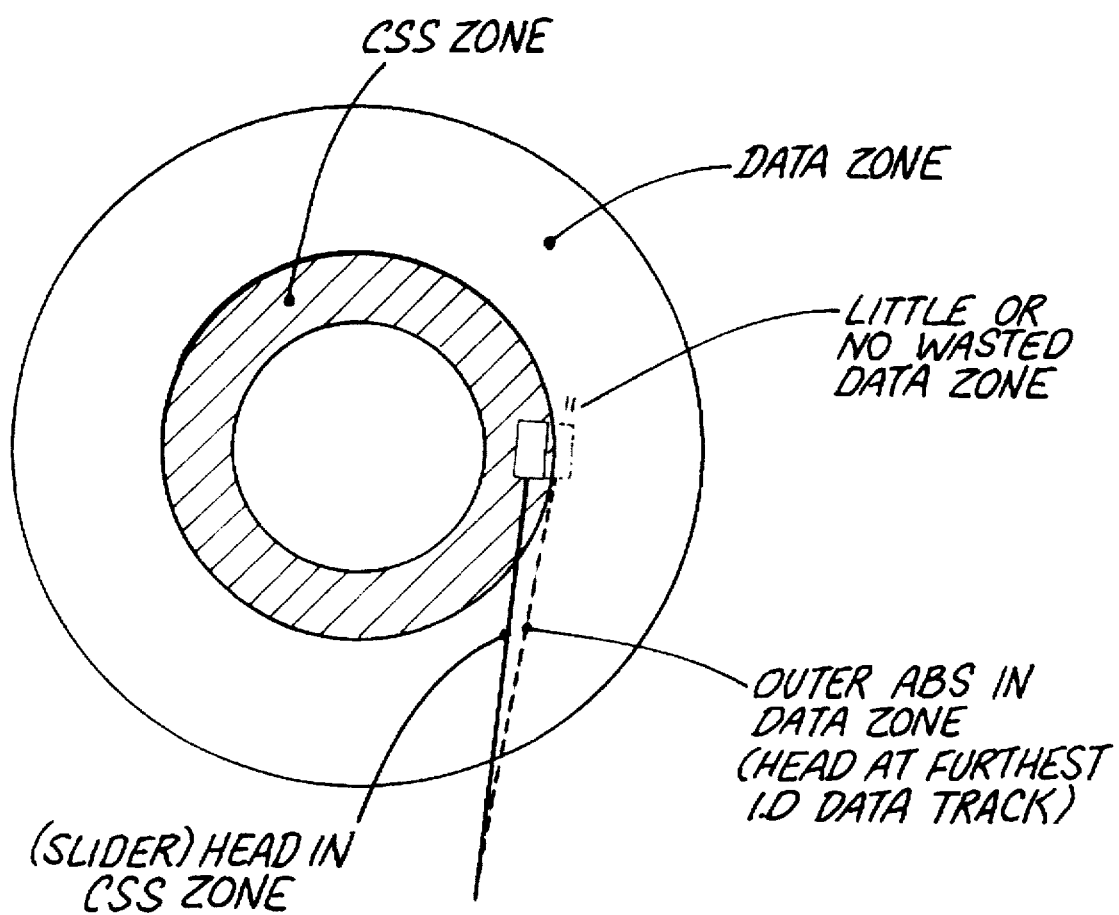
FIG. 5 is a top plan view of a slider and a zone-textured disc where little or none of the area of the data zone is wasted.

To avoid the inner ABS contacting with the disc surface in the CSS zone while accessing data, the inner ABS is made to fly higher than the outer ABS. The inner ABS should fly above the glide level of the CSS zone of the disc surface. FIG. 5 illustrates such a configuration. In this embodiment, a typical fly height would be approximately 1.0–2.0 μin for the outer ABS and 0.5–1.5 μin for the inner ABS. In such a case, the slider would have a 0.5–1.0 μin roll. Data area savings would depend on the slider width: approximately 6% savings for 95 mm discs, 10% savings for 65 mm discs, and 15% savings for 48 mm discs. One skilled in the art will appreciate that typical fly heights for the inner and outer ABS will vary depending on the contour of the CSS, the aerodynamics of the slider, the rotational speed of the disc or discs, etc.

The roll can be induced by a number of methods including: (1) load point adjustment, (2) air bearing asymmetry, and (3) negative pressure effects. The optimal placement of the transducer would be nearest the outer ABS edge. One skilled in the art, however, will appreciate that the CSS zone can be placed at the outer diameter of the disc. Thus, the optimal placement of the transducer would then be at the inner ABS edge. Some possible improvements in CSS performance may occur using the present invention because one (e.g., the inner) ABS would then lift off of the CSS surface at a lower velocity than the sliders where there is little or no roll. The invention is particularly well suited for use with magnetoresistive sensors.

Although the present invention has been described with reference to preferred embodiments, workers skilled in the art will recognize that changes may be made in form and detail without departing from the spirit and scope of the invention.

What is claimed is:

1. A disc drive, comprising:

a disc having a surface, a contact start/stop zone disposed about an inner diameter of said surface, and having a texture protruding from said surface, said texture having a glide level, and a data zone contiguous with said contact start/stop zone having a plurality of concentric tracks a slider having a width and an air bearing surface with an inner rail and an outer rail for flying over said disc when said disc rotates, said inner rail having a first fly height which is greater than said glide level, said inner rail of said slider being closer to said inner diameter of said disc than said outer rail of said slider, said outer rail having a second fly height, which is less than said first fly height when said slider is proximate said contact start/stop zone;

a transducer coupled to said outer rail of said slider, said transducer writing data to and reading data from said concentric tracks on said surface of said disc;

a read/write controller coupled to said transducer for positioning said first rail over said contact start/stop zone while positioning said second rail over said data zone while causing said transducer to read and write information on said data zone adjacent said contact start/stop zone.

2. The apparatus of claim 1 wherein said second fly height is less than said glide level.

3. The apparatus of claim 2 wherein a difference between said first fly height and said second fly height is caused by a load point adjustment of said slider.

4. The apparatus of claim 2 wherein a difference between said first fly height and said second fly height is caused by asymmetry of said inner rail with respect to said outer rail of said air bearing surface.

5. The apparatus of claim 2 wherein a negative pressure exists in an area between said inner rail and said outer rail of said air bearing surface when said slider is flying over the surface of said disc, such that said negative pressure causes said first fly height to be greater than said second fly height.

6. The apparatus of claim 2 wherein said transducer is arranged near an outer edge of said outer rail of said air bearing surface.

7. The apparatus of claim 1 wherein a negative pressure exists in an area between said inner rail and said outer rail of said air bearing surface when said slider is flying over said surface of said disc, such that negative pressure causes said first fly height to be greater than said second fly height.

8. The apparatus of claim 1 wherein a difference between said first fly height and said second fly height is caused by a load point adjustment of said slider.

9. The apparatus of claim 1 wherein a difference between said first fly height and said second fly height is caused by asymmetry of said inner rail with respect to said outer rail of said air bearing surface.

10. The apparatus of claim 1 wherein said transducer is arranged near an outer edge of said outer rail of said air bearing surface.

11. In a disc drive having a disc including a disc surface having an inside diameter, said disc including a textured contact start/stop zone disposed about said inside diameter and a data zone contiguous with said contact start/stop zone, said disc drive having a slider having an air bearing surface, and inner and outer rails extending therefrom such that said inner rail is closer to said inside diameter than said outer rail, said disc drive also having a transducer coupled to said outer rail; a method of accessing said disc comprising the steps of:

positioning said slider such that said inner rail flies over said contact start/stop zone while said outer rail flies over said data zone; and performing one of reading from and writing to said disc with a transducer carried on said outer rail while said inner rail flies over said contact start/stop zone.

12. The method of claim 11 wherein a first fly height of said inner rail of said air bearing surface is greater than a second fly height of said outer rail of said air bearing surface.

13. The method of claim 12 wherein said first fly height is greater than said second fly height due to a load point adjustment of said slider.

14. The method of claim 12 wherein said first fly height is greater than said second fly height due to asymmetry of said inner rail with respect to said outer rail.

15. The method of claim 12 wherein a negative pressure exists in an area between said inner rail and said outer rail when said slider is flying over said surface of said disc, such that said negative pressure causes said first fly height to be greater than said second fly height of said outer rail.

16. The method of claim 12 wherein said transducer is arranged near an outer edge of said outer side of said air bearing surface.

17. The method of claim 11 wherein said transducer is arranged near an outer edge of said outer rail of said air bearing surface.

* * * * *